US009386670B2

(12) United States Patent
Nittke

(10) Patent No.: US 9,386,670 B2
(45) Date of Patent: Jul. 5, 2016

(54) ELECTRIC LAMP

(71) Applicant: OSRAM GmbH, Munich (DE)

(72) Inventor: Andreas Nittke, Adelschlag OT Pietenfeld (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/447,663

(22) Filed: Jul. 31, 2014

(65) Prior Publication Data
US 2015/0035439 A1   Feb. 5, 2015

(30) Foreign Application Priority Data

Aug. 5, 2013  (DE) .......................... 10 2013 215 379

(51) Int. Cl.
| H05B 37/00 | (2006.01) |
| H05B 37/03 | (2006.01) |
| H01K 1/34 | (2006.01) |
| H01K 1/64 | (2006.01) |
| H01K 1/66 | (2006.01) |
| F21V 25/04 | (2006.01) |
| F21K 99/00 | (2016.01) |
| F21Y 101/02 | (2006.01) |

(52) U.S. Cl.
CPC ............... *H05B 37/03* (2013.01); *H01K 1/34* (2013.01); *H01K 1/64* (2013.01); *H01K 1/66* (2013.01); *F21K 9/135* (2013.01); *F21V 25/04* (2013.01); *F21Y 2101/02* (2013.01); *Y02B 20/125* (2013.01)

(58) Field of Classification Search
CPC .......................................................... H01J 5/54
USPC ................ 313/49–51, 25, 402–407, 161–162
See application file for complete search history.

(56) References Cited

U.S. PATENT DOCUMENTS

| 4,170,744 | A | * | 10/1979 | Hansler | ................. | H05B 41/04 |
| | | | | | | 315/100 |
| 4,481,446 | A | * | 11/1984 | Tsuchihashi et al. | ........... | 315/73 |
| 4,517,493 | A | * | 5/1985 | Dembowski et al. | ........... | 315/73 |
| 4,910,427 | A | * | 3/1990 | Aelterman et al. | ............. | 313/25 |
| 5,670,840 | A | | 9/1997 | Lanese et al. | | |
| 2011/0204777 | A1 | * | 8/2011 | Lenk | ......................... | F21K 9/00 |
| | | | | | | 315/32 |
| 2013/0058080 | A1 | * | 3/2013 | Ge et al. | ........................ | 362/231 |

FOREIGN PATENT DOCUMENTS

DE        4337807 A1    5/1994

* cited by examiner

*Primary Examiner* — Minh D A
(74) *Attorney, Agent, or Firm* — Viering, Jentschura & Partner mbB

(57) ABSTRACT

In various embodiments, an electric lamp includes a light source having at least two supply lines configured to supply electrical energy to the light source, and an outer bulb surrounding the light source. The outer bulb is filled with inert gas. The lamp further includes a disconnection mechanism arranged within the outer bulb. At least one of the supply lines is interrupted in the event that the disconnection mechanism is tripped. The disconnection mechanism has a switch.

11 Claims, 4 Drawing Sheets

ELECTRIC LAMP

CROSS-REFERENCE TO RELATED APPLICATION

This application claims priority to German Patent Application Serial No. 10 2013 215 379.1, which was filed Aug. 5, 2013, and is incorporated herein by reference in its entirety.

TECHNICAL FIELD

Various embodiments relate generally to an electric lamp.

BACKGROUND

In the event of a breakage in the enveloping bulb of halogen incandescent lamps with outer bulbs, there are two possible safety risks: (a) the lamp continues to burn, which can lead to a fire in the case of a luminaire that has fallen over, and (b) the electrical connections of the burner are still live, which can be particularly dangerous in the case of a defective burner. A conventional solution, in which a fuse, which is interconnected in series with the light source and is in the form of a filament in the lamp, burns through, disconnects the lamp too slowly to avoid risk (a). In addition, a marked loss of efficiency arose as a result of using the filament. At the present time, there is no satisfactory solution to electrical hazards that come under risk (b).

A tungsten-halogen lamp having a filament chamber which is permeable to light, provided with an IR coating and encloses an incandescent filament is disclosed in DE 43 37 807 A1, which lamp is enclosed within an outer bulb. Fuses are connected to the opposite ends of the incandescent filament in order to limit the size and duration of an electric arc across a breakage in the incandescent filament, which, in combination with a filling-gas pressure of not more than about 0.33 MPa (3300 mbar), is intended to reduce the probability of a failure of the container.

SUMMARY

In various embodiments, an electric lamp includes a light source having at least two supply lines configured to supply electrical energy to the light source, and an outer bulb surrounding the light source. The outer bulb is filled with inert gas. The lamp further includes a disconnection mechanism arranged within the outer bulb. At least one of the supply lines is interrupted in the event that the disconnection mechanism is tripped. The disconnection mechanism has a switch.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
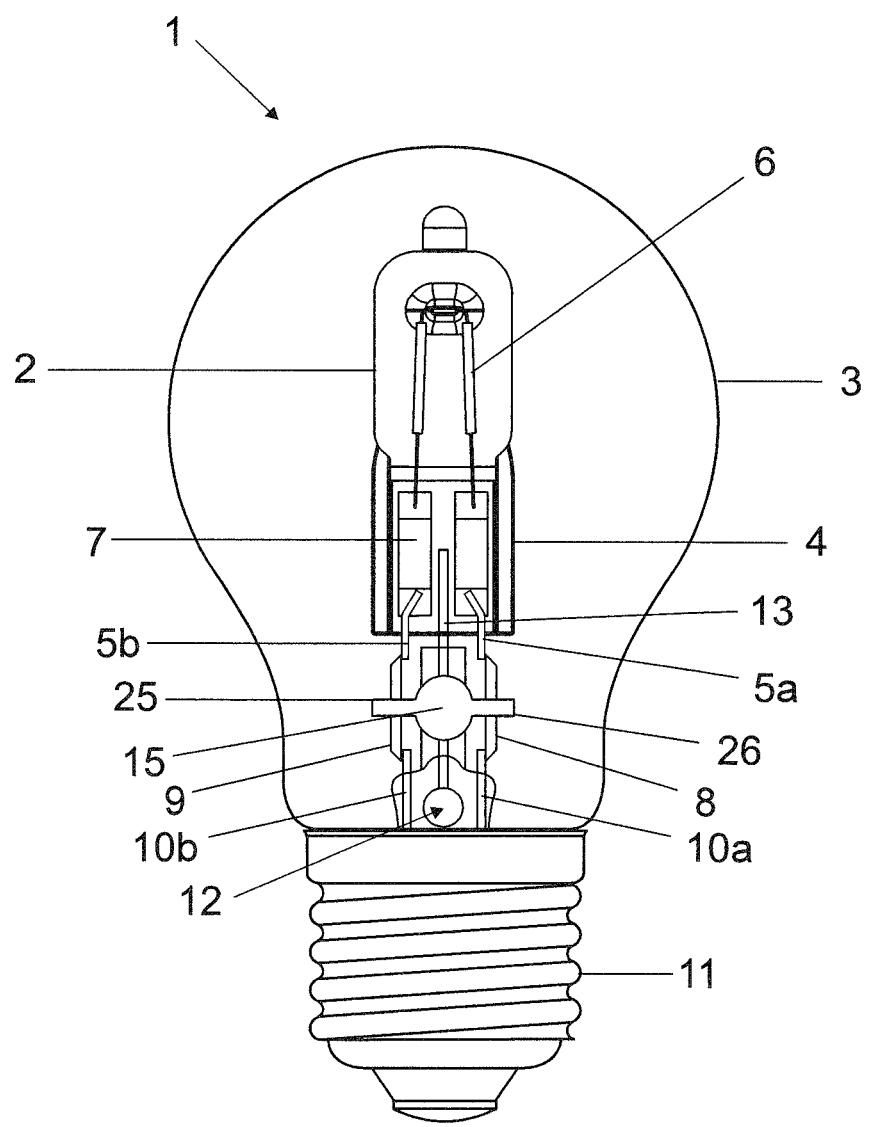
FIG. 1 shows a side view of a halogen incandescent lamp with outer bulb and disconnection mechanism.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide an electric lamp. having a light source, wherein the light source can be supplied with electrical energy via two supply lines, the light source is surrounded by an enveloping or outer bulb, the outer bulb is filled with inert gas and a disconnection mechanism is housed in the outer bulb, at least one of the supply lines being interrupted in the event that said disconnection mechanism is tripped. Various embodiments are applicable to halogen incandescent lamps for general illumination with outer bulbs.

Various embodiments may at least partially overcome the disadvantages of the prior art and, for example, may provide an electric lamp which disconnects cost-effectively as soon as a breakage occurs in the outer bulb.

Various embodiments provide an electric lamp having a light source, wherein the light source can be supplied with electrical energy via two supply lines or power feeds. The light source is surrounded by an outer bulb. The outer bulb is filled with inert gas and a disconnection mechanism is housed in the outer bulb. At least one of the supply lines are interrupted in the event that said disconnection mechanism is tripped. The disconnection mechanism has a pressure impulse switch, and a negative pressure prevails in the outer bulb.

In the case of said electric lamp, both of the risks mentioned at the outset are avoided, that is to say both the fire risk and the electrical risk. Therefore, a lamp such as this is markedly safer than products up to now. In this case, use is made of the fact that, in the event of the outer bulb breaking, the pressure outside of the pressure impulse switch suddenly increases and thus trips said switch. The trip occurs rapidly. In addition, a pressure impulse switch can be manufactured and installed in a simple and inexpensive way. It is also possible to realize a pressure impulse switch in a compact manner.

It is a development that the electric lamp has a lamp base and the light source is connected to the base via the two supply lines. The base may be, for example, an Edison base, a bayonet base or a bi-pin base.

One configuration is that the light source is a halogen incandescent lamp or halogen burner as built-in lamp or a light emitting diode (LED) module.

Another configuration is that the disconnection mechanism is electrically interconnected in parallel with the light source, wherein the pressure impulse switch is designed to close in the event that the disconnection mechanism is tripped. Therefore, in the event that the disconnection mechanism is tripped, the two supply lines are short-circuited, as a result of which a current therein increases. The increased current destroys the supply lines, which are configured as fuses, or one or more components thereof. This configuration has the advantage that in this way a particularly compact and efficient electric lamp is provided.

An alternative or additional configuration is that the disconnection mechanism is built in (in series) to a supply line. In this case, the pressure impulse switch may open in the event that the disconnection mechanism is tripped (for example owing to an increase in pressure) and thus interrupt the supply line to the light source. The pressure impulse switch therefore opens the circuit containing the light source. The disconnection mechanism is designed, e.g. for this case, such that it trips irreversibly, that is to say remains permanently in the tripping state.

In general, after it has tripped, the disconnection mechanism may return to its non-tripping state. It may be provided, for a permanent interruption of the at least one supply line, that the disconnection mechanism is configured such that it remains permanently in the tripping state once it has tripped. For this purpose, the disconnection mechanism may be, for example, plastically deformed, latched or clamped once it has tripped.

The interruption of the circuit of the light source can be realized even more reliably by at least one of the supply lines having a permanently interrupting overcurrent protection device. The overcurrent protection device remains in the interrupted state for an unlimited time once it has tripped, more precisely, even if the disconnection mechanism were intended to return to its non-tripping state. For this purpose, it may be provided that the disconnection mechanism is interconnected between the at least one overcurrent protection device and the light source, that is to say when the disconnection mechanism trips, the current flows through the at least one overcurrent protection device and the disconnection mechanism but no longer flows through the light source.

Another development is that the permanently interrupting overcurrent protection device is a fuse. This is robust, durable and trips reliably. However, a permanently interrupting overcurrent protection device may also be an appropriately dimensioned piece of wire in the supply lines which melts through in the case of the increase in current triggered by the pressure.

In addition, one configuration is that in each case one overcurrent protection device, e.g. a fuse, is built into at least one of the supply lines. For reliable interruption of both supply lines and hence to realize particularly effective shock protection in order to avoid risk (b), it may be provided that both supply lines are equipped with an overcurrent protection device, e.g. a fuse, in each case. The fuses may therefore be designed such that they both trip in the event of a short-circuit; that is to say the lamp is completely deenergized in regions which can be touched by a user.

In order to avoid any regions of the supply lines which are exposed and live after a breakage of the outer bulb being touched, it may be provided for the overcurrent protection devices, e.g. fuses, to be housed in a base of the electric lamp.

The disconnection mechanism may be mounted in the outer bulb between the two supply lines of the light source.

Another configuration is that an absolute pressure of at most 200 mbar prevails in the outer bulb at room temperature, e.g. an absolute pressure of between approximately 50 mbar and 100 mbar. Owing to the high pressure difference in comparison with the ambient pressure, a particularly reliable and rapid switching of many forms of pressure impulse switches may be provided.

In various embodiments, the outer bulb is filled with inert gas, for example with nitrogen or a nitrogen mixture, for example a nitrogen-argon mixture.

Another configuration is that the pressure impulse switch has a pot-shaped main body, the pot-shaped main body is loosely closed off with an electrically conductive cover, the cover can be pressed into the pot, the cover is connected to two electrically conductive lines (described in the following text as "contact elements" without restriction to generality) and the two supply lines are connectable to one another via the contact elements and the cover on the basis of a penetration depth of the cover into the pot-shaped main body.

Owing to a sudden increase in pressure, the cover may be pressed into the pot-shaped main body. As a result, the contact elements may also be pressed downwards and then make contact with in each case one supply line. Consequently, from a predetermined penetration depth of the cover into the pot-shaped main body, a short-circuit may be produced between the two supply lines via the contact elements and the cover located therebetween.

The cover may be forced to stay at said tripping penetration depth in that, for example, the cover is clamped in the pot-shaped main body. Alternatively or in addition, a latching lug or the like can be fixed to the pot-shaped main body, which latching lug prevents the cover from springing up again.

Owing to the fact that the cover does not tightly close off the pot-shaped main body, the gas volume located in the pot-shaped main body can be slowly pumped out during the assembly process and no further materials, e.g. no sealing means, are necessary.

Alternatively, the disconnection mechanism may be designed, for example, such that the switch is closed in the rest position and is held in the open position by a thin wire, a slight latching protusion or the like. A resistance thus has to be overcome in order to actuate the switch. This may be done in the event of a breakage of the outer bulb.

Another configuration is that a first contact element of the two contact elements connects the cover to the pot-shaped main body and, for this purpose, is configured as a bent element. Thus, a connection which is compact and easy to produce can be achieved between the pot-shaped main body and the cover. In addition, the bent element is easily deformable in the bent region thereof and applies only a low resistance against an insertion movement of the cover.

Another configuration is additionally that at least the cover and the contact elements are made from spring plate, which enables the disconnection mechanism to have a low weight. As a result of this, it can be easily and inexpensively ensured that the disconnection mechanism does not yet trip at accelerations of up to 200 g. A configuration such as this is advantageous since the cold impact resistance of present halogen incandescent lamps does not normally exceed accelerations of 200 g. In various embodiments, the spring plate is a thin metal plate with a preferred thickness of less than 0.1 mm.

In the case of the above-described disconnection mechanism with the pot-shaped main body, the cover and a contact element which behaves in a spring-like manner between said pot-shaped main body and said cover, the measure of the penetration of the cover into the pot-shaped main body is determined by an external acceleration, by a spring constant D of the resilient contact element and by the resilient mass, while the closing force which is caused by a pressure impulse is substantially determined by the area of the cover, apart from the clearance, that is to say the width of the gap, which separates the cover from the edge of the pot-shaped main body. The thinner the material is, the higher the acceleration values that the trip unit can withstand without tripping the disconnection means.

In principle, the disconnection element can be assembled from a plurality of individual parts which are manufactured separately in advance, for example assembled by welding the contact elements to the cover and to the pot-shaped main body.

However, it is a configuration for a simpler manufacture of a particularly robust disconnection element that the pressure impulse switch is manufactured in one piece, for example by stamping and reshaping a layer of spring plate. The reshaping may include deep-drawing and/or bending.

Furthermore, one configuration is that the first contact element is permanently electrically connected to one of the supply lines and the other, second contact element of the two contact elements is arranged in the vicinity of the other supply line and, when the cover is pressed into the pot-shaped main body, the second contact element makes contact with said other supply line. When the cover penetrates into the pot-shaped main body, the second contact element is taken with it, hence is led to the other supply line, makes contact with said other supply line and generates the short-circuit.

In the situation before the tripping of the disconnection mechanism, which can be understood as a pressure impulse switch, the second contact element is therefore arranged e.g. in a manner spaced apart from the assigned second supply line. The first contact element is in fixed electrical contact with the first supply line. After the tripping, the cover is lowered into the pot-shaped main body owing to the penetrating "positive pressure", more precisely to such an extent that, as a consequence of the lowering, the second contact element touches the second supply line, with the result that a short-circuit is permanently present between the first and second supply lines and, as a result of this, for example, any fuses come into operation.

The permanent mechanical and electrical connection of the first contact element to one of the supply lines can be achieved, for example, by means of soldering or welding, e.g. laser beam welding.

In various embodiments, the disconnection mechanism has two, e.g. strip-like, contact elements made from spring steel etc., which end at two points on the movable cover, e.g. at the upper edge thereof. The points may be located on opposite sides of the cover. The cover loosely covers the pot-shaped main body. The first strip-like contact element is bent like a hook. On its end near the cover, it has a short, angled end section. The second strip-like contact element has, overall, the shape of a right-angled triangle, which is not closed, however. A first side goes horizontally directly away from the edge of the pot-shaped main body. It is bent back in the upward direction to form a second, diagonal side—effectively the hypotenuse—more precisely at an acute angle which is preferably between approximately 10 and 30°. Approximately at the level of the start of the first side, the second side is bent back in the downward direction and ends in a short end section which is arranged approximately at right angles to the first side and likewise ends on the cover. The exact shape of the two contact elements is not essential, however. In various embodiments, a resilient property of the contact element which connects the cover to the pot-shaped main body may be provided. In various embodiments, a resilient property of the other contact element is preferred in order to produce a particularly reliable electrical contact with the assigned supply line in the event of a trip occurring. In this respect, the cover is only in electrical contact with the two supply lines when the disconnection mechanism is tripped, that is to say the cover has penetrated into the pot-shaped main body by a predetermined penetration depth.

In various embodiments, one or more of the features detailed below may be provided:

An electric lamp is equipped with a light source, wherein the light source is surrounded by an outer bulb, wherein the outer bulb is filled with inert gas, wherein the light source in the outer bulb is connected to two current supply systems, wherein a disconnection mechanism is housed in the outer bulb, wherein the disconnection mechanism is a pressure impulse switch which is connected in parallel with the light source, wherein a fill pressure of at most 200 mbar (absolute) prevails in the outer bulb at room temperature.

The pressure impulse switch can have a pot-shaped main body which is loosely closed off with a cover, wherein the cover is connected between two electric lines ("contact elements").

At least one of the contact elements (e.g. that which bears the pot-shaped main body) is made from spring plate.

A first contact element has three sections, wherein a first section points away from the edge of the pot-shaped main body, proceeding from the latter, a second section is bent back at an acute angle with respect to the first section as a spring arm in the direction of the cover, and a third section is bent back from the second section in the direction toward the cover and makes contact with the cover, preferably is rigidly connected thereto.

The first contact element may be permanently connected to the assigned first supply line.

A second contact element is bent like a hook with two limbs, e.g. bent into an L-shape, wherein the free end of the second limb ends at the cover and the free end of the first limb ends in the vicinity of an assigned supply line.

The second contact element may be releasably connected to a second assigned supply line, wherein the disconnection means is tripped either by releasing or by touching the second supply line.

At least one fuse is built into the supply line(s), wherein, for example, both supply lines are equipped with a fuse in each case.

FIG. 1 shows the construction of a halogen incandescent lamp 1. It has a light source in the form of an inner bulb or burner 2 which is made from quartz glass or hard glass and is housed in an outer bulb 3. The burner 2 has a pinch 4 at its first end and a halogen-containing filling. External contact pins 5*a* and 5*b* of the burner 2 make contact with a luminaire 6 on the inside of the burner, for example by means of films 7, and are connected to two fuses 8 and 9. The fuses 8, 9 are connected to further lines 10*a* and 10*b* which end in a lamp base 11 which is positioned on the outer bulb 3.

The contact pin 5*a* and the line 10*a* form a first supply line for supplying power to the burner 2, into which supply line the fuse 8 is integrated or built. The contact pin 5*b* and the line 10*b* form a second supply line for supplying power to the burner 2, into which supply line the fuse 9 is built.

A plate-like stand 12 closes off the outer bulb 3 and stabilizes the lines 10*a* and 10*b*. A holder 13 extends from the plate-like stand 12 to the burner 2 and stabilizes the latter in the region of the pinch 4.

Furthermore, the halogen incandescent lamp 1 is equipped with a pressure impulse switch 15 as disconnection mechanism. The pressure impulse switch is connected in parallel with the burner 2 by means of two contact elements 25, 26 or, in other words, it interacts with the two contact pins 5a and 5b. Details in relation thereto are explained in connection with FIG. 2 to FIG. 4.

The outer bulb is filled with inert gas. A (cold) fill pressure is usually from 50 to 100 mbar. As a result of this, firstly, a sufficient pressure difference with respect to atmospheric pressure is achieved for the pressure impulse switch 15 to be able to be tripped, and secondly, the fill pressure is high enough that an electrical breakdown which is too easy is prevented.

Figure 2:
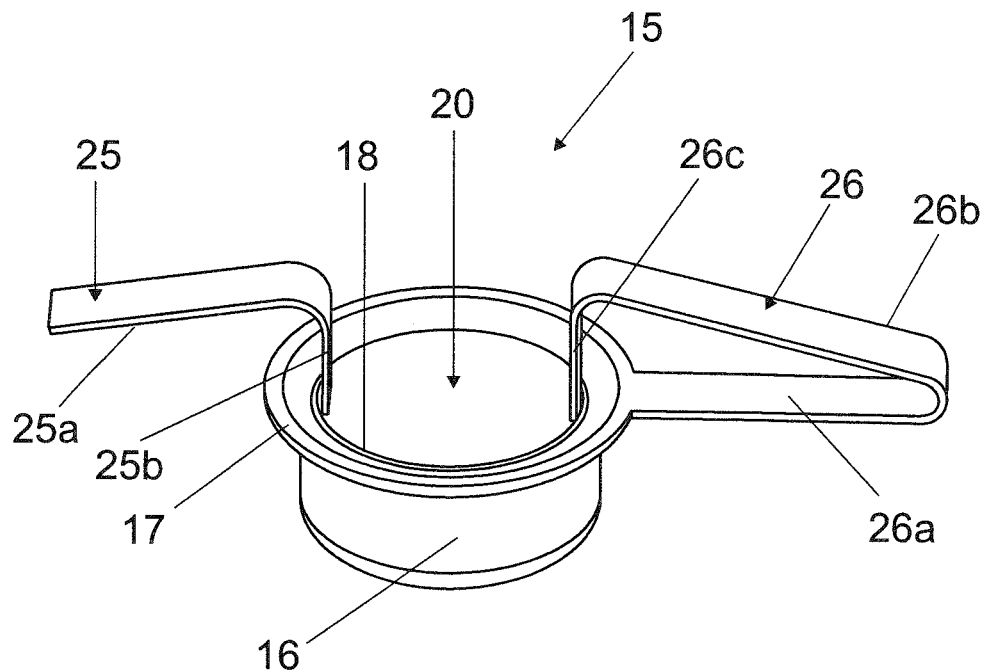
FIG. 2 shows a perspective view of a disconnection mechanism.

FIG. 2 shows an embodiment of a pressure impulse switch 15, such as can be used in FIG. 1. The pressure impulse switch 15 has a pot-shaped main body 16 with a slightly outwardly angled edge 17. A cover 20 sits inside approximately at the level of the edge 17, said cover being designed to be disk-shaped and being separated from the edge 17 of the pot-shaped main body 16 by a narrow gap 18 for slow pressure equalization. The cover 20 is connected to the two contact elements 25 and 26, which in each case are connected to the cover 20 at the outer edge thereof.

A first contact element 26 made from spring plate projects from the edge 17 of the pot-shaped main body 16. A first, straight section 26a thereof extends away from the pot-shaped main body 16 horizontally with respect thereto to the extent that it touches the first contact pin 5a. In various embodiments, the first contact element 26 is welded to the contact pin 5a. A second, straight section 26b adjoins the first section 26a at an angle. The second section 26b is led back obliquely at an acute angle until the level of the cover 20. There, it is adjoined by a third section 26c, which third section is at an acute angle with respect to the second section 26b and extends as far as the cover 20, to which it is connected, for example by welding.

The second contact element 25 is an L-shaped strip of spring plate, wherein a first section or limb 25a of the "L" points outward, e.g. away from the pot-shaped main body 16 and from the cover 20. The first limb 25a ends in the vicinity of the second contact pin 5b. A second section or limb 25b adjoins the cover-side of the first limb 25a and ends above the cover 20. The second limb 25b is also connected, for example welded, to the cover 20 at the outer edge thereof.

Overall, the cover 20 is fixed in a freely floating manner in its position by one of the two contact elements 25, 26; in various embodiments, by the first contact element 26.

In various embodiments, the pressure impulse switch 15 may have been manufactured in one piece, for example by separation from, for example, a spring plate and subsequent reshaping.

Figure 3:
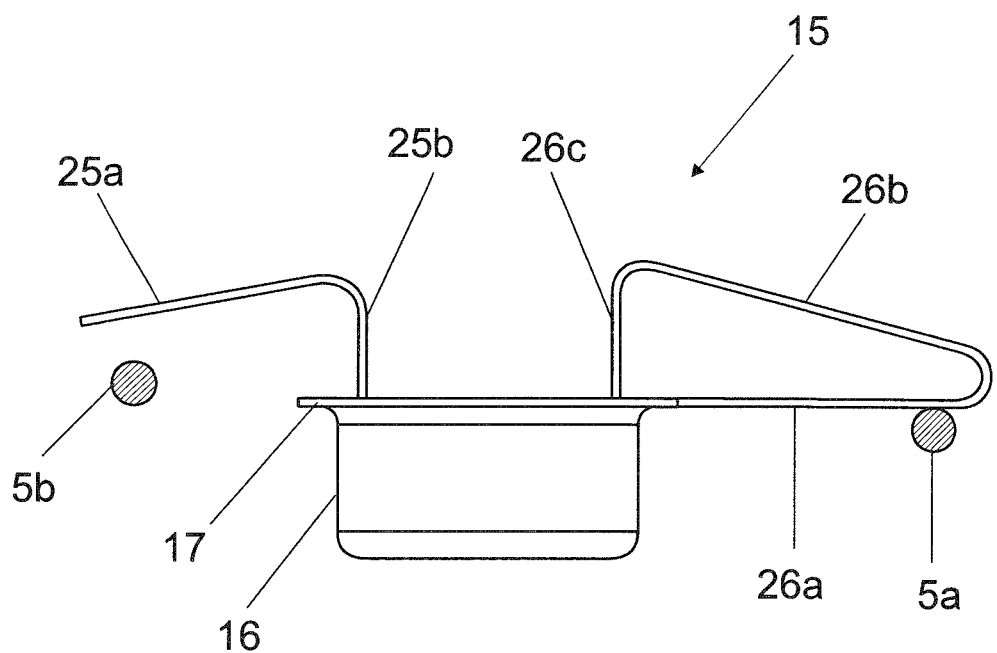
FIG. 3 shows a side view of the disconnection mechanism before it has tripped.

FIG. 3 shows a position of the pressure impulse switch 15 relative to the contact pins 5a and 5b before said switch has tripped. Before the tripping, only the first contact element 26 is in (fixed) contact with the first contact pin 5a. In contrast, the second contact element 25 in this state is arranged near the second contact pin 5a and spaced apart from the latter sufficiently that no sparkover occurs.

Figure 4:
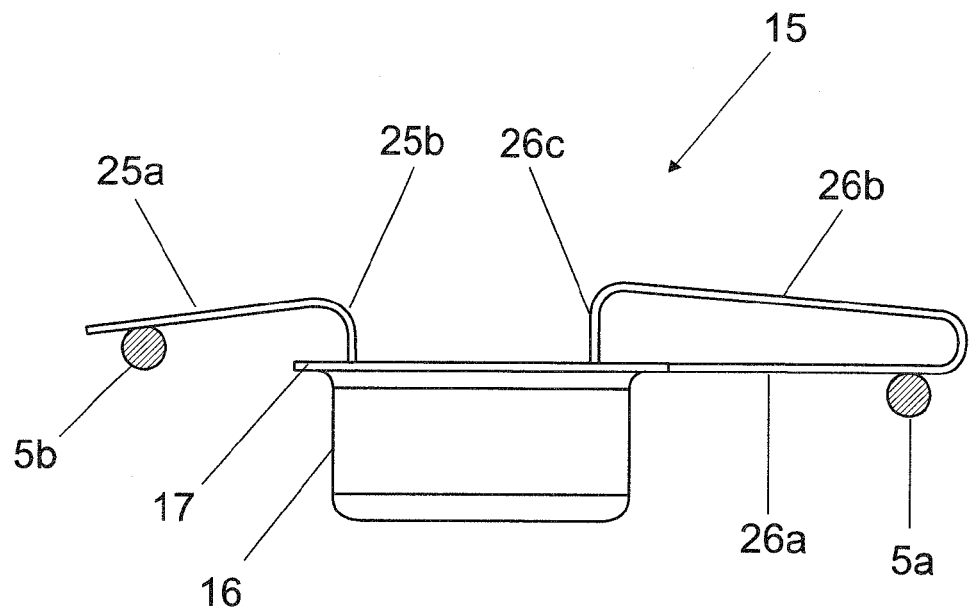
FIG. 4 shows a side view of the disconnection mechanism after it has tripped.

FIG. 4 shows a position of the pressure impulse switch 15 relative to the contact pins 5a and 5b after said switch has tripped, wherein it is assumed that in the event of a breakage of the outer bulb 3, air penetrates there, which means a sudden pressure increase and leads to the cover 20 being pressed inwards into the pot-shaped main body 16 by a certain distance by said pressure impulse. Since the two contact elements 25 and 26 are rigidly connected to the cover 20, after a short amount of time, the second contact element 25 touches the first contact pin 5a with its first limb 25a and causes a short-circuit between the two contact pins 5a and 5b, which ultimately causes the fuses 8 and 9 to melt and, as a result, permanently disconnects the halogen incandescent lamp 1.

Figure 5:
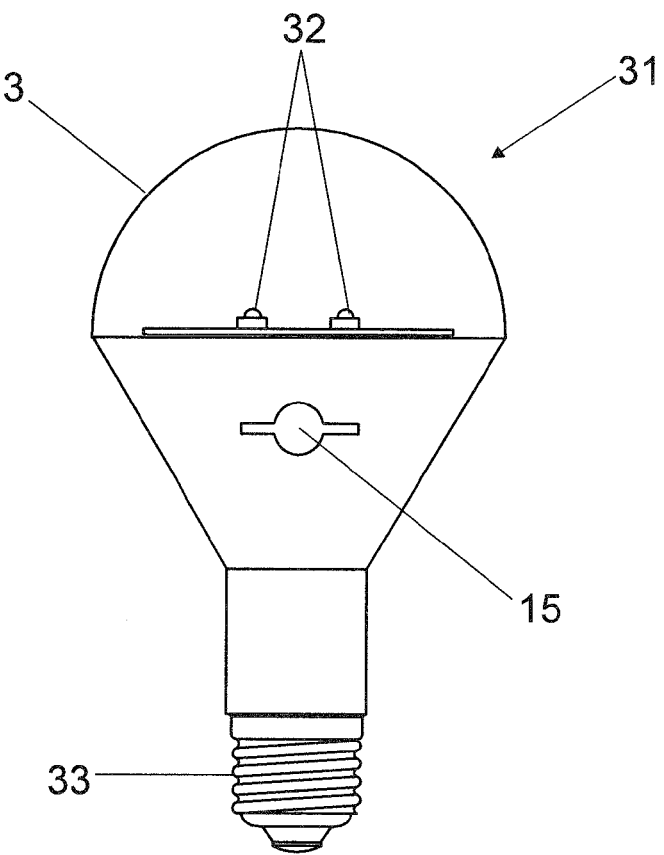
FIG. 5 shows a side view of a retrofit lamp with outer bulb and disconnection mechanism.

FIG. 5 shows a halogen incandescent lamp 31 according to various embodiments, in which the light source is an LED module 32 which is housed in the outer bulb 3. The connections of the LED module 32 are connected to the base 33 via a pressure impulse sensor 15.

Figure 6:
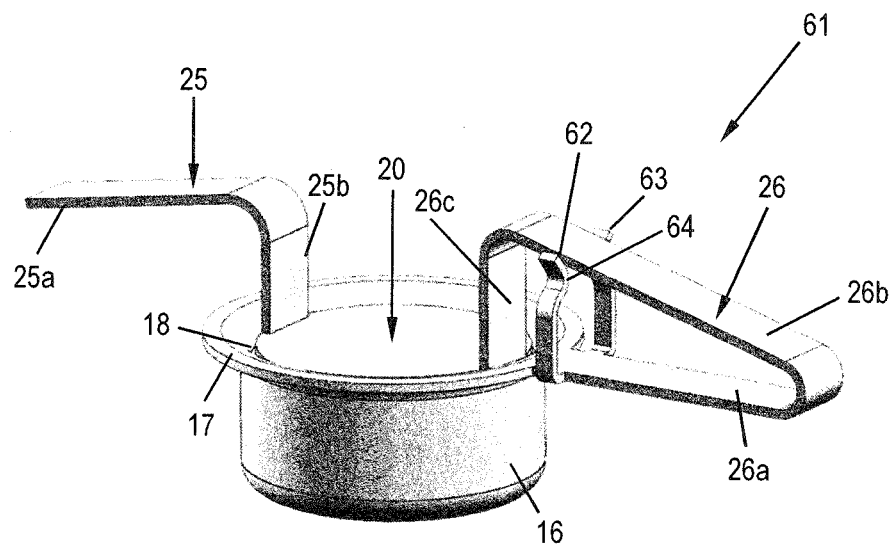
FIG. 6 shows an oblique view of a further disconnection mechanism before it has tripped.

FIG. 6 shows an oblique view of another disconnection mechanism in the form of a pressure impulse switch 61 before it has tripped. The pressure impulse switch 61 differs from the pressure impulse switch 15 in that it has a latching device 62, 63 on the first contact element 26, said latching device being for latching the cover 20 in its pressed in and therefore tripping (closed) position. The latching device 62, 63 has two latching flaps 62 and 63 which project from the first section 26a of the first contact element 26 in the direction of the second section 26b and which project from opposite edges of the first section 26a proceeding in the direction of the second section 26b. The latching flaps 62 and 63 have in each case latching lugs 64 which are oriented inward and therefore toward one another. In the untripped (rest) state, the latching lugs 64 are between the first section 26a and the second section 26b. The latching flaps 62 and 63 are elastically bendable.

Figure 7:
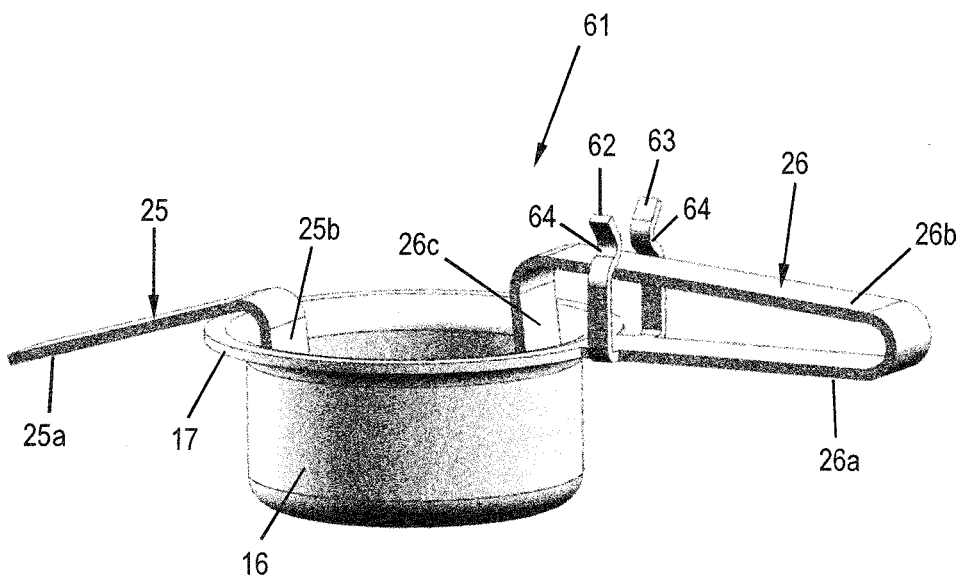
FIG. 7 shows an oblique view of the further disconnection mechanism after it has tripped.

FIG. 7 shows the pressure impulse switch 61 after it has tripped. During the tripping, the second section 26b is bent in the direction of the first section 26a and, in this case, presses the latching lugs 64 which are in its way laterally outward. As a result, the latching flaps 62 and 63 are bent outward, with the result that the second section 26b slides past the latching lugs 64. Then, the latching flaps 62 and 63 spring back into their starting position, with the result that the second section 26b is engaged with said flaps. The latching flaps 62, 63 then prevent the second section 26b, and hence also the cover 20 and the second contact element 25, from returning to a position in which the pressure impulse switch 61 is no longer tripping (open), which could occur by means of the second section 26b springing back with respect to the first section 26a of the first contact element 26. The opening force required to press the latching flaps 62 and 63 apart to produce disengagement is consequently greater than the force which can be exerted laterally on the latching flaps 62 and 63 by means of the springing back of the second section 26b.

In various embodiments, the fuses may be housed in general outside the outer bulb, for example in the base. There, they are at ambient pressure. In addition, the supply lines may be configured differently to how they are illustrated.

In general, "a", "one", etc. can be understood to mean a singular or a plural, in particular in the sense of "at least one" or "one or a plurality", etc., as long as this is not explicitly excluded, e.g. by the expression "exactly one", etc.

Moreover, a numerical indication can encompass exactly the indicated number and also a customary tolerance range, as long as this is not explicitly excluded.

LIST OF REFERENCE SIGNS 1 halogen incandescent lamp
2 burner
3 outer bulb
4 pinch
5a, 5b external contact pin
6 luminaire
7 film 8, 9 fuse
10a, 10b line
11 lamp base
12 plate-like stand
13 holder
15 pressure impulse switch
16 pot-shaped main body
17 edge
18 gap
20 cover
25 second contact element
25a first limb
25b second limb
26 first contact element
26a-c section
31 halogen incandescent lamp
32 LED module
33 base
61 pressure impulse switch
62, 63 latching device
64 latching lug
D spring constant While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An electric lamp, comprising:
a light source configured to be supplied with electrical energy via two supply lines;
wherein the light source is surrounded by an outer bulb;
wherein the outer bulb is filled with inert gas;
wherein a disconnection mechanism is housed in the outer bulb, at least one of the supply lines being interrupted in the event that said disconnection mechanism is tripped;
wherein the disconnection mechanism has a pressure impulse switch;
wherein a negative pressure prevails in the outer bulb;
wherein the disconnection mechanism is electrically interconnected in parallel with the light source;
wherein at least one of the supply lines has a permanently interrupting overcurrent protection device;
wherein the disconnection mechanism is interconnected between the at least one overcurrent protection device and the light source; and
wherein the pressure impulse switch is designed to close in the event that the disconnection mechanism is tripped.

2. The electric lamp of claim 1,
wherein the overcurrent protection device has a fuse built into at least one of the supply lines.

3. The electric lamp of claim 2,
wherein both supply lines are equipped with a fuse in each case.

4. The electric lamp of claim 1,
wherein the disconnection mechanism is built into one supply line; and
wherein the pressure impulse switch is designed to open in the event that the disconnection mechanism is tripped.

5. The electric lamp of claim 1,
wherein an absolute pressure of at most 200 mbar prevails in the outer bulb at room temperature.

6. The electric lamp of claim 1,
wherein the light source is a halogen incandescent lamp as built-in lamp or a light emitting diode module.

7. An electric lamp, comprising:
a light source configured to be supplied with electrical energy via two supply lines;
wherein the light source is surrounded by an outer bulb;
wherein the outer bulb is filled with inert gas;
wherein a disconnection mechanism is housed in the outer bulb, at least one of the supply lines being interrupted in the event that said disconnection mechanism is tripped;
wherein the disconnection mechanism has a pressure impulse switch;
wherein a negative pressure prevails in the outer bulb;
wherein the pressure impulse switch has a pot-shaped main body;
wherein the pot-shaped main body is loosely closed off with an electrically conductive cover;
wherein the cover can be pressed into the pot-shaped main body;
wherein the cover is connected to two electrically conductive contact elements; and
wherein the two supply lines are connectable to one another via the contact elements and the cover on the basis of a penetration depth of the cover into the pot-shaped main body.

8. The electric lamp of claim 7,
wherein a first contact element of the two contact elements connects the cover to the pot-shaped main body and, for this purpose, is configured as a bent spring element.

9. The electric lamp of claim 8,
wherein at least the cover and the contact elements are made from spring plate.

10. The electric lamp of claim 7,
wherein the pressure impulse switch is manufactured in one piece.

11. The electric lamp of claim 7,
wherein the first contact element is permanently connected to one of the supply lines and the other, second contact element of the two contact elements is arranged in the vicinity of the other supply line and, when the cover is pressed into the pot-shaped main body, the second contact element makes contact with said other supply line.

* * * * *